United States Patent
Ishikawa et al.

(10) Patent No.: US 9,499,700 B2
(45) Date of Patent: Nov. 22, 2016

(54) FINISHING AGENT FOR CHEMICAL CONVERSION COATING AND METHOD FOR PRODUCING SAME

(75) Inventors: Shusaku Ishikawa, Aichi (JP); Tomoko Saito, Aichi (JP)

(73) Assignee: Yuken Industry Co., Ltd., Aichi (JP)

(*) Notice: Subject to any disclaimer, the term of this patent is extended or adjusted under 35 U.S.C. 154(b) by 0 days.

(21) Appl. No.: 13/822,675

(22) PCT Filed: Aug. 11, 2011

(86) PCT No.: PCT/JP2011/068378
§ 371 (c)(1),
(2), (4) Date: Mar. 13, 2013

(87) PCT Pub. No.: WO2012/035917
PCT Pub. Date: Mar. 22, 2012

(65) Prior Publication Data
US 2013/0177709 A1    Jul. 11, 2013

(30) Foreign Application Priority Data
Sep. 14, 2010 (WO) ................. PCT/JP2010/065830

(51) Int. Cl.
C09D 7/12 (2006.01)
C23C 22/20 (2006.01)
C23C 22/68 (2006.01)

(52) U.S. Cl.
CPC ............. *C09D 7/1233* (2013.01); *C23C 22/20* (2013.01); *C23C 22/68* (2013.01); *C23C 2222/10* (2013.01)

(58) Field of Classification Search
CPC ................. C09D 7/1233; C23C 22/20; C23C 22/68; C23C 2222/10
USPC ....................................... 427/385.5
See application file for complete search history.

(56) References Cited

U.S. PATENT DOCUMENTS

2010/0180793 A1* 7/2010 Dingwerth et al. ......... 106/14.41
2011/0217476 A1* 9/2011 Dingwerth et al. .......... 427/436

FOREIGN PATENT DOCUMENTS

| EP | 0485972 A1 | 5/1992 | |
| JP | 11-76933 A | 3/1999 | |
| JP | 2003-293156 A | 10/2003 | |
| JP | 2004-346360 A | 12/2004 | |
| JP | 2005-23372 A | 1/2005 | |
| JP | 2005-320573 A | 11/2005 | |
| JP | 2008-255408 A | 10/2008 | |
| JP | 2010-529300 A | 8/2010 | |
| WO | WO 2010/060883 | * 6/2010 | ............. C23C 22/10 |

OTHER PUBLICATIONS

International Search Report issued in PCT/JP2011/068378 mailed Nov. 8, 2011 (4 pages).
Office Action dated Jul. 9, 2013 in corresponding Japanese Patent Application No. 2011-240496, with translation (6 pages).
Extended European Search Report issued Dec. 1, 2014 in corresponding European application No. 11824925.9 (7 pages).

* cited by examiner

*Primary Examiner* — Robert S Walters, Jr.
(74) *Attorney, Agent, or Firm* — Osha Liang LLP

(57) ABSTRACT

A finishing agent satisfies a condition that (A) the ratio of the chromium equivalent molar concentration of a water-soluble trivalent chromium-containing substance contained in the finishing agent relative to the phosphorus equivalent molar concentration of a water-soluble phosphoric acid-based compound contained in the finishing agent is 0.5 or more, or a condition that (B) a water-soluble aluminum-containing substance and/or a water-soluble zirconium-containing substance are contained in the finishing agent such that the ratio of the total of the chromium equivalent molar concentration of the water-soluble trivalent chromium-containing substance, the aluminum equivalent molar concentration of the water-soluble aluminum-containing substance, and the zirconium equivalent molar concentration of the water-soluble zirconium-containing substance relative to the phosphorus equivalent molar concentration of the water-soluble phosphoric acid-based compound is 0.5 or more.

7 Claims, No Drawings

FINISHING AGENT FOR CHEMICAL CONVERSION COATING AND METHOD FOR PRODUCING SAME

TECHNICAL FIELD

The present invention relates to a finishing agent for a chemical conversion coating, and more particularly to a finishing agent, for a chemical conversion coating, which is capable of forming a finishing coating suppressed in the dissolution of trivalent chromium and a method for producing the same.

BACKGROUND ART

In view of providing desirable properties such as corrosion resistance to a member having metal surface such as iron, zinc and aluminum, chemical conversion treatment is being widely practiced for a member having metal surface. The mainstream as a chemical conversion coating obtained by such chemical conversion treatment has conventionally been a so-called chromate coating that contains hexavalent chromium. However, the use thereof is substantially prohibited with consideration for environmental conservation, so the currently used chemical conversion coating is that which does not substantially contain hexavalent chromium but contains trivalent chromium, i.e. a hexavalent chromium-free chemical conversion coating (referred hereinafter simply to as "chemical conversion coating").

In addition, properties needed for surface treatment are being notably upgraded in recent years. In this regard, finishing treatment may further be performed in many cases for a member having been formed thereon with the above chemical conversion coating in order to provide a corrosion resistance comparable with or higher than that of a chromate coating.

This finishing treatment is an applying-type process and performed in a manner as below. A finishing agent is caused to contact with a member of which the surface has been treated with chemical conversion treatment (referred also to as "member under treatment" in the present invention) to form a liquid film of the finishing agent on the surface, and the member having been formed thereon with this liquid film is dried to form a finishing coating on the member under treatment.

In general, the finishing coating is configured of an organic-based material that forms a matrix of the coating and an inorganic-based material that provides desirable properties such as corrosion resistance. As the inorganic-based material, for example, phosphoric acid or other phosphoric acid-based compound and trivalent chromium are used (e.g. Patent Document 1).

If, however, the inorganic-based material comprises phosphoric acid-based compound and trivalent chromium, then the trivalent chromium elutes out from the formed finishing coating due to the moisture adhering to the finishing coating thereby resulting in a problem such that the finishing coating does not have desired sufficient corrosion resistance. Hereinafter, an ability to suppress such elution of trivalent chromium from the finishing coating is referred to as elution resistance.

Accordingly, proposed conventional techniques include a means for adding zinc to the finishing treatment agent as disclosed in Patent Document 2.

PRIOR ART LITERATURE

Patent Literature

[Patent Document 1] Japanese Published Patent Application No. 2003-293156
[Patent Document 2] Japanese Published Patent Application No. 2005-023372

DISCLOSURE OF THE INVENTION

Problems to be Solved by the Invention

The above means for adding zinc is recognized to have a certain effect in a point that the finishing coating is provided with elution resistance. However, if components including zinc are contained, then another problem occurs as follows.

That is, when the temperature of the finishing treatment agent or the concentrated liquid thereof increases and/or when a certain amount of time elapses after the production of these liquids, zinc tends to form crystalline precipitate together with other components. Such precipitate blocks the above liquids from being transferred. More specifically, if the concentrated liquid is added by using a transfer pump to automatically control the concentration of the finishing treatment agent, then a serious problem may occur, such as the stoppage of the transfer pump. In addition, even though the stoppage of the transfer pump may not occur, if the composition of the finishing agent gets out of a predetermined control range because the concentrated liquid is not appropriately supplied due to the presence of the precipitate, then the finishing coating obtained from this finishing agent will have poor gloss and accordingly poor appearance. In this case, another problem also occurs that the finishing coating does not have desired corrosion resistance.

In view of such existing circumstances, objects of the present invention are, through new approaches distinctly different from conventional ones, to provide a finishing agent, for a member having a chemical conversion coating, which is capable of forming a finishing coating having excellent corrosion resistance and excellent appearance as well as having high elution resistance, to provide a method for producing the finishing agent, and to provide a member having a finishing coating obtained from the finishing agent.

Means for Solving the Problems

As a result of intensive studies for solving the above problems, the present inventors have acquired knowledge below.

A finishing agent is caused to contain a water-soluble dicarboxylic acid compound thereby allowing elution resistance to be improved even without containing components that include zinc, wherein the water-soluble dicarboxylic acid compound is a water-soluble substance that comprises one or more kinds selected from dicarboxylic acids and hydroxydicarboxylic acids of which the carbon number is four or less, ions thereof, and salts and coordination compounds including the ions thereof.

The ratio (hereinafter referred also to as "Cr/P ratio") of a chromium equivalent molar concentration of a water-soluble trivalent chromium-containing substance (which means in the present invention a substance that includes trivalent chromium in the state of being dissolved in a finishing agent) relative to a phosphorus equivalent molar concentration of a water-soluble phosphoric acid-based compound, which comprises one or more water-soluble substances selected from the group consisting of orthophosphoric acid and condensed phosphoric acid, ions thereof, and salts and coordination compounds including the ions thereof, is set to be 0.5 or more to relatively decrease the content of the water-soluble phosphoric acid-based compound included in a finishing agent, and the elution resistance can thereby be improved even if components including zinc are not contained in the finishing agent.

A finishing agent is caused to contain one or more kinds selected from the group consisting of a water-soluble aluminum-containing substance (which means in the present invention a substance that includes an aluminum ion in the state of being dissolved in a finishing agent) and a water-soluble zirconium-containing substance (which means in the present invention a substance that includes a zirconium ion in the state of being dissolved in the finishing agent), and the ratio (hereinafter referred also to as "TM/P ratio") of the total of the chromium equivalent molar concentration of the water-soluble trivalent chromium-containing substance, an aluminum equivalent molar concentration of the water-soluble aluminum-containing substance, and a zirconium equivalent molar concentration of the water-soluble zirconium-containing substance relative to the phosphorus equivalent molar concentration of the water-soluble phosphoric acid-based compound is set to be 0.5 or more, thereby the elution resistance can be improved even if components including zinc are not contained in the finishing agent.

The finishing agent is caused to contain the above water-soluble aluminum-containing substance and/or water-soluble zirconium-containing substance thereby allowing the appearance of the obtained finishing coating to be particularly improved.

One aspect of the present invention, provided on the basis of the above knowledge, is a finishing agent for forming a finishing coating on a member under treatment, the member under treatment being a member a surface of which has been treated with chemical conversion treatment, the finishing agent containing: a water-soluble phosphoric acid-based compound comprising one or more water-soluble substances selected from the group consisting of orthophosphoric acid and condensed phosphoric acid, ions thereof, and salts and coordination compounds including the ions thereof; a water-soluble organic acid compound comprising one or more water-soluble substances selected from organic acids, ions thereof, and salts and coordination compounds including the ions thereof; a water-soluble trivalent chromium-containing substance; and an organic-based material as a matrix-forming component, the finishing agent substantially not containing a nitric acid ion. In addition, this finishing agent further satisfies at least one of conditions (A) and (B) below.

(A) The ratio of a chromium equivalent molar concentration of the water-soluble trivalent chromium-containing substance relative to a phosphorus equivalent molar concentration of the water-soluble phosphoric acid-based compound is 0.5 or more; and (B) The finishing agent further contains at least one kind selected from the group consisting of a water-soluble aluminum-containing substance and a water-soluble zirconium-containing substance, and the ratio (TM/P ratio) of the total of the chromium equivalent molar concentration of the water-soluble trivalent chromium-containing substance, an aluminum equivalent molar concentration of the water-soluble aluminum-containing substance, and a zirconium equivalent molar concentration of the water-soluble zirconium-containing substance relative to the phosphorus equivalent molar concentration of the water-soluble phosphoric acid-based compound is 0.5 or more.

A finishing agent substantially not containing a certain component herein means that the content of that component is sufficiently low in the finishing agent so that a significant change in properties based on that component being contained does not occur in the finishing agent and the finishing coating obtained therefrom.

In a case where the above finishing agent satisfies the condition (B), it is preferred that the ratio of a trivalent chromium equivalent molar concentration of the water-soluble trivalent chromium-containing substance relative to a phosphoric acid equivalent molar concentration of the water-soluble phosphoric acid-based compound is 0.2 or more, and/or the water-soluble organic acid compound comprises at least one of citric acid and an ion thereof.

It is preferred that the above finishing agent is substantially free of at least one of a sulfuric acid ion and a chloride ion and preferably both thereof. It is also preferred that the pH is within a range of 5.0 or more and 7.0 or less.

The organic-based material as the matrix-forming component in the above finishing agent may include polyvinyl alcohol.

Another aspect of the present invention is a method for producing a member having a finishing coating, and the method comprises: a contact step of causing a member under treatment, as a member a surface of which has been treated with chemical conversion treatment, and the above finishing agent according to the present invention to contact with each other to form a liquid film of the finishing agent on the member under treatment; and a drying step of causing the liquid film obtained by the contact step to provide the finishing coating.

It is preferred that the member under treatment in the above method is one that has not been subjected to treatment for drying the surface treated with the chemical conversion treatment.

Advantageous Effect of the Invention

The finishing treatment agent according to the present invention may be used thereby to provide a finishing coating having excellent elution resistance while avoiding the risk of deteriorating the productivity and/or the quality. Moreover, in a case where the finishing agent is caused to contain the water-soluble aluminum-containing substance and/or the water-soluble zirconium-containing substance, the appearance of the obtained finishing coating can be particularly improved.

Note that the advantageous effect according to the present invention, in particular the advantageous effect of particularly improving the appearance, is obtained significantly for secondary processed products (products, such as bolt, nut, and punched out product, which are given relatively complex shapes by performing a machining process to primary processed products) rather than for primary processed products (such as plate material and rod material).

BEST MODES FOR CARRYING OUT THE INVENTION

Descriptions will be directed to components of the finishing agent according to the present invention and a method for producing the same as well as a method for producing a member having the finishing coating obtained from the finishing agent.

1. Finishing Agent (1) Water-Soluble Trivalent Chromium-Containing Substance

The finishing agent according to the present invention contains a water-soluble trivalent chromium-containing substance. The water-soluble trivalent chromium-containing substance comprises one or more kinds selected from the group consisting of trivalent chromium ($Cr^{3+}$) and water-soluble substances that contain trivalent chromium. Examples of the water-soluble substances that contain trivalent chromium include $[Cr(H_2O)_6]^{3+}$.

It is preferred to use a water-soluble compound capable of forming trivalent chromium in water (referred hereinafter to as "water-soluble trivalent chromium compound") as a substance to be compounded in order for the chemical conversion liquid to contain the water-soluble trivalent chromium-containing substance, i.e. a supply source for the water-soluble trivalent chromium-containing substance.

Examples of the water-soluble trivalent chromium compound include trivalent chromium salts, such as chromium chloride, chromium sulfate, chromium phosphate and chromium acetate, as well as compounds obtained by reducing hexavalent chromium compounds such as chromic acid and bichromate to trivalent chromium using a reductant agent. The water-soluble trivalent chromium compound may be comprised of one type of compound or may also be comprised of plural types of compounds. It should be appreciated that the finishing agent according to the present invention does not substantially contain hexavalent chromium because a hexavalent chromium compound is not positively added as a raw material to the finishing agent according to the present invention.

Preferable water-soluble trivalent chromium compound is chromium phosphate, and it is particularly preferable that chromium phosphate is solely used as the water-soluble trivalent chromium compound. This realizes that the finishing agent does not substantially contain a nitric acid ion, a sulfuric acid ion, and a chloride ion. Such a finishing agent has excellent corrosion resistance because of not containing these ions in the finishing coating.

The content of the water-soluble trivalent chromium compound may be set in accordance with desired properties of the finishing coating. As one example, the content is 0.1 g/L or more and 30 g/L or less. With consideration for aspects of economic efficiency and liquid waste disposal as well, it is preferred that the upper limit thereof is about 20 g/L. Particularly preferable content of the water-soluble trivalent chromium compound is 0.5 g/L or more and 15 g/L or less.

(2) Water-Soluble Phosphoric Acid-Based Compound

The finishing agent according to the present invention contains a water-soluble phosphoric acid-based compound. The water-soluble phosphoric acid-based compound comprises one or more water-soluble substances selected from the group consisting of orthophosphoric acid and condensed phosphoric acid, ions thereof, and salts and coordination compounds including the ions thereof. The condensed phosphoric acid as used herein is a collective term that represents polyphosphoric acid (general formula: $M_{n+2}P_nO_{3n+1}$, where n is an integer larger than two), metaphosphoric acid (general formula: $(HPO_3)_n$, where n is an integer larger than two), and ultra-phosphoric acid (general formula: $xH_2O \cdot yP_2O_5$, where $0<x/y<1$). The water-soluble phosphoric acid-based compound may be comprised of one type of compound or may also be comprised of plural types of compounds. In a case where the water-soluble phosphoric acid-based compound comprises one or more condensed phosphoric acids, the one or more condensed phosphoric acids may preferably be polyphosphoric acid and/or metaphosphoric acid from the viewpoint of easy handling. In a case where the water-soluble phosphoric acid-based compound is a salt or a coordination compound, cations included in the compound are not limited. Examples thereof include a sodium ion and a potassium ion.

The content of the water-soluble phosphoric acid-based compound may be set in accordance with desired properties of the finishing coating. As one example, the content is 0.1 g/L or more and 50 g/L or less. With consideration for aspects of economic efficiency and liquid waste disposal as well, it is preferred that the upper limit thereof is about 40 g/L. Particularly preferable content of the water-soluble phosphoric acid-based compound is 1 g/L or more and 25 g/L or less.

As one aspect of the present invention, in order to improve the elution resistance of the finishing coating obtained from the finishing agent according to the present invention, the ratio (Cr/P ratio) of a chromium equivalent molar concentration of the water-soluble trivalent chromium-containing substance relative to a phosphorus equivalent molar concentration of the water-soluble phosphoric acid-based compound is set to be 0.5 or more. Hereinafter, the above means for improving the elution resistance of the finishing coating by setting the Cr/P ratio within a specific range will be referred to as "means 1". The upper limit of the Cr/P ratio is not provided from the viewpoint of improving the elution resistance. If the Cr/P ratio is unduly high, then the possibility that the appearance of the finishing coating is degraded becomes high, thus being concerned, so the Cr/P ratio is preferably set to be 1.0 or less.

(3) Water-Soluble Organic Acid Compound

The finishing agent according to the present invention contains a water-soluble organic acid compound comprising one or more water-soluble substances selected from organic acids, ions thereof, and salts and coordination compounds including the ions thereof. One example of the organic acid according to the water-soluble organic acid compound is calboxylic acid, and more specifically, examples thereof include: monocarbonic acids, such as formic acid, acetic acid, and propionic acid; dicarboxylic acids, such as oxalic acid, malonic acid, succinic acid, glutaric acid, adipic acid, pimelic acid, suberic acid, azelaic acid, sebacic acid, maleic acid, phthalic acid, and terephthalic acid; tricarboxylic acids such as tricarballylic acid; hydroxycarboxylic acids, such as glycolic acid, lactic acid, malic acid, tartaric acid, citric acid, and ascorbic acid; and aminocarboxylic acids, such as glycine and alanine. The organic acid according to the water-soluble organic acid compound may be comprised of one type or may also be comprised of plural types. The water-soluble organic acid compound may be compounded as an organic acid into the finishing agent or as a salt or a derivative (e.g. an ester) thereof. In a case where the water-soluble organic acid compound is a salt or a coordination compound, cations included in the compound are not limited. Examples thereof include a sodium ion and a potassium ion.

The content of the water-soluble organic acid compound may be set such that the pH of the finishing agent is allowed to be within a range of 5 or more and 7 or less. As one example, the content is 1.0 g/L or more and 100.0 g/L or less. With consideration for aspects of economic efficiency and liquid waste disposal as well, it is preferred that the upper limit thereof is about 80.0 g/L. Particularly preferable content of the water-soluble organic acid compound is 5.0 g/L or more and 60.0 g/L or less.

As another aspect of the present invention, in order to improve the elution resistance of the finishing coating obtained from the finishing agent according to the present invention, the water-soluble organic acid compound comprises a water-soluble dicarboxylic acid compound as a water-soluble substance that comprises one or more kinds selected from dicarboxylic acids and hydroxydicarboxylic acids having four or less carbon atoms, ions thereof, and salts and coordination compounds including the ions thereof. Hereinafter, the above means for improving the elution resistance of the finishing coating by causing the water-soluble organic acid compound to comprise the water-soluble dicarboxylic acid compound will be referred to as "means 2".

Means 1 and means 2 as used herein may be employed in combination, or otherwise either one of means 1 or 2 may be employed. That is, if the elution resistance is improved by employing means 1, then the water-soluble organic acid compound may not comprise a water-soluble dicarboxylic acid compound, while on the other hand, if the elution resistance is improved by employing means 2, then the Cr/P ratio may be less than 0.5.

Specific examples of the dicarboxylic acid compound include oxalic acid, malonic acid, succinic acid, maleic acid, fumaric acid, methylmalonic acid, malic acid, isomalic acid, tartronic acid, tartaric acid, hydroxyfumaric acid, dihydroxyfumaric acid, hydroxymaleic acid, and dihydroxymaleic acid, and ions thereof. The water-soluble dicarboxylic acid compound preferably comprises a water-soluble substance that comprises, among them, one or more kinds selected from oxalic acid, malonic acid, and malic acid, ions thereof, and salts and coordination compounds including the ions thereof.

The total content of the water-soluble dicarboxylic acid compound of the water-soluble organic acid compound is not particularly limited. As one example, the content is 0.1 g/L or more and 90.0 g/L or less. With consideration for aspects of economic efficiency and liquid waste disposal as well, it is preferred that the upper limit thereof is about 80.0 g/L. Particularly preferable content of the water-soluble dicarboxylic acid compound is 5.0 g/L or more and 60.0 g/L or less.

It is to be noted that, even in a case where means 2 is employed to contain the water-soluble dicarboxylic acid compound, another water-soluble substance may also be contained which includes one or more organic acids other than the water-soluble dicarboxylic acid compound.

(4) Water-Soluble Aluminum-Containing Substance and Water-Soluble Zirconium-Containing Substance As still another aspect of the present invention, in order to improve the elution resistance in the finishing coating obtained from the finishing agent according to the present invention, the finishing agent according to the present invention contains one or more kinds selected from the group consisting of a water-soluble aluminum-containing substance and a water-soluble zirconium-containing substance. The water-soluble aluminum-containing substance comprises one or more kinds selected from the group consisting of an aluminum ion and a water-soluble substance that contains an aluminum ion. The water-soluble zirconium-containing substance comprises one or more kinds selected from the group consisting of a zirconium ion and a water-soluble substance that contains a zirconium ion.

In a case where the finishing agent contains the water-soluble aluminum-containing substance and/or the water-soluble zirconium-containing substance, the ratio (TM/P ratio) of the total of the chromium equivalent molar concentration of the water-soluble trivalent chromium-containing substance, the aluminum equivalent molar concentration of the water-soluble aluminum-containing substance, and the zirconium equivalent molar concentration of the water-soluble zirconium-containing substance relative to the phosphorus equivalent molar concentration of the water-soluble phosphoric acid-based compound is set to be 0.5 or more. Hereinafter, the above means for improving the elution resistance of the finishing coating by causing the water-soluble aluminum-containing substance and/or the water-soluble zirconium-containing substance to be contained and setting the TM/P ratio within a specific range will be referred to as "means 3". The finishing coating obtained from the finishing agent according to means 3 has enhanced gloss, and a member having excellent appearance comparable with jet-black color can thus be obtained if the chemical conversion treatment having been performed for the member under treatment is a treatment for forming a black colored chemical conversion coating (black chemical conversion treatment). That is, means 3 is preferable also from the viewpoint of improving the appearance of a member that comprises the finishing coating.

Means 3 as used herein may be employed in combination with means 1 and/or means 2, or means 3 may also be solely employed.

The upper limit of the TM/P ratio is not provided from the viewpoint of improving the elution resistance. If the TM/P ratio is unduly high, then the content of the water-soluble phosphoric acid-based compound is relatively unduly decreased and the possibility that the corrosion resistance is deteriorated becomes high, thus being concerned, so the TM/P ratio is preferably set to be 1.5 or less.

If means 3 is employed, the Cr/P ratio is preferred to be 0.2 or more. The Cr/P ratio being within this range makes particularly small the possibility that the corrosion resistance is deteriorated due to relatively unduly decreased content of the water-soluble trivalent chromium-containing substance.

If means 3 is employed, the water-soluble organic acid compound is preferred to comprise at least one of citric acid and an ion thereof. The finishing agent containing citric acid and/or an ion thereof enhances the stability of the water-soluble aluminum-containing substance and/or the water-soluble zirconium-containing substance in the finishing agent.

(5) Matrix-Forming Component

The finishing agent according to the present invention contains an organic-based material as a component (matrix-forming component) to be a matrix component, i.e. a binder component, of the finishing coating. The organic-based material is preferred to be a water-soluble polymer compound and/or water-dispersible polymer compound. Examples of such an organic-based material include polyvinyl alcohol (PVA), polyacrylic acid, polymethacrylic acid, copolymer of acrylic acid and methacrylic acid, copolymer of ethylene and an acrylic-based monomer such as acrylic acid and an acrylate, copolymer of ethylene and vinyl acetate, polyurethane, amino-modified phenol resin, polyester resin, epoxy resin, tannin, and tannic acid and salt thereof. The organic-based material may comprise a monomer and/or oligomer capable of configuring the above polymer compound and may also comprise a polymerization initiator. The matrix-forming component may be comprised of one type of compound or may also be comprised of plural types of compounds. The matrix-forming component is preferred to contain polyvinyl alcohol among them from the viewpoint of scratch resistance.

The content of the matrix-forming component in the finishing agent is not particularly limited. The content is appropriately set in consideration of the thickness of the finishing coating, the mechanical strength needed for the finishing coating, and other factors. As one example, the content is 0.1 g/L or more and 10.0 g/L or less. With consideration for aspects of economic efficiency and liquid waste disposal as well, it is preferred that the upper limit thereof is about 8.0 g/L. Particularly preferable content of the matrix-forming component is 0.1 g/L or more and 5.0 g/L or less.

(6) Other Components

The finishing agent according to the present invention may also contain one or more components below other than the above components: water-soluble metal-containing substances (each of which contains metal in the state of being dissolved in the finishing agent and which is a substance other than the above water-soluble chromium-containing substance, water-soluble aluminum-containing substance, and water-soluble zirconium-containing substance), surfactant agents (e.g. polyol), inorganic-based matrix-forming components (e.g. colloidal silica), pigments, colorants, pigment-generating agents (e.g. metal pigment-generating agents), corrosion inhibitor agents, lubricant material (e.g. wax), desiccant agents, dispersant agents, sulfur-containing substances, and nitrogen-containing substances. These components will hereinafter be collectively referred to as "other components".

The water-soluble metal-containing substance as used herein may contain a component that includes zinc, i.e. water-soluble zinc-containing substance. The member under treatment, which is to be subjected to the finishing treatment, is a member that has been subjected to a chemical conversion treatment, and the surface of the member having been treated with the chemical conversion treatment may have been comprised of zinc-based plating in some cases. In such a case, the treatment liquid for the chemical conversion treatment contains a water-soluble zinc-containing substance originated from zinc plating, so that a water-soluble zinc-containing substance may remain on the surface of the member under treatment even through being washed by water after the chemical conversion. As such, the finishing agent used many times may contain a certain quantity of the water-soluble zinc-containing substance. Although the content of the water-soluble zinc-containing substance in this case varies depending on the treatment history, the content may even be about 1 g/L (15 mmol/L) in zinc equivalent. However, such a small content may result in a lower possibility that the effect is actualized that the elution resistance is improved on the basis of the finishing agent containing zinc. On the other hand, such a small content may also have a lower possibility that precipitate including zinc is formed as previously described. Therefore, even if the water-soluble zinc-containing substance is contained with about 1 g/L in zinc equivalent, this does not substantially affect the present invention.

The content of the other components is not limited. The content may be appropriately set as necessary so long as not obstructing the action of enhancing the elution resistance of the finishing coating by employing the above means 1 to 3.

(7) pH

The finishing agent according to the present invention is an aqueous composition, and the pH thereof is preferred to be 5 or more and 7 or less. If the pH is unduly lower than 5, there is concern that the chemical conversion coating is excessively dissolved. If, on the other hand, the pH is unduly higher than 7, then the stability of the finishing agent is deteriorated thereby to degrade the quality of the finishing coating, thus being concerned. Particularly preferable range of the pH is 5.0 or more and 7.0 or less.

2. Method for Preparing the Finishing Agent

The method for preparing the finishing agent according to the present invention is not particularly limited. The water-soluble trivalent chromium compound, the supply source for the water-soluble phosphoric acid-based compound, the supply source for the water-soluble organic acid compound, and the matrix-forming component, and if necessary the supply source for the water-soluble aluminum-containing substance, the supply source for the water-soluble zirconium-containing substance, and/or the above other components are each measured as an appropriate amount, and these may be mixed with water as a solvent.

Another means is such that a concentrated liquid is preliminarily prepared in which at least one of the above components to be contained in the finishing agent are concentrated to about 4 to 20 times of the contents compared to those in the finishing agent, and this liquid may be diluted with a suitable dilution rate to prepare the finishing agent.

Chromic phosphate aqueous solution (aqueous solution of which the solute is the mixture of chromic phosphate and phosphoric acid) is preferably used as the supply source for the water-soluble trivalent chromium-containing substance (i.e. water-soluble trivalent chromium compound) and the supply source for the water-soluble phosphoric acid-based compound. If compounds other than the chromic phosphate are used as the water-soluble trivalent chromium compound, then the finishing coating will contain counter ions to trivalent chromium, such as chloride ions and nitric acid ions. Such anions may possibly act as factors that deteriorate the corrosion resistance of the finishing coating.

For the same reason, in a case where the finishing agent is produced according to means 3, the supply source for the water-soluble aluminum-containing substance is preferred to be aluminum phosphate, sodium aluminate, and/or aluminum hydroxide phosphoric acid, and the supply source to be used for the water-soluble zirconium-containing substance is preferred to be zirconium phosphate, ammonium zirconium carbonate, zirconium oxide, and/or zirconium hydroxide.

Note that chromic phosphate aqueous solution available in easiest way is generally such that the number of moles of the contained phosphoric acid component in phosphorus equivalent is three times of the number of moles of contained trivalent chromium, that is, the Cr/P ratio is 0.33. Therefore, if such chromic phosphate aqueous solution is used to produce the finishing agent according to means 1, then a water-soluble trivalent chromium compound other than chromic phosphate must be compounded in order to increase the Cr/P ratio. In such a case, however, counter ions to trivalent chromium are contained in the finishing coating. In this regard, in a case where the finishing coating is produced according to means 1, chromic phosphate aqueous solution is preferred to be used such that the number of moles of the contained phosphoric acid component is twice the number of moles of contained trivalent chromium or less.

3. Method for Producing a Member Comprising the Finishing Coating

One preferable example of a method for producing a member comprising the finishing coating according to the present invention is as follows. The method comprises a contact step and a drying step as will be described below.

(1) Contact Step

After preparing a member under treatment as a member of which the surface has been treated with chemical conversion treatment, the contact step causes this member under treatment and the above finishing agent according to the present invention to contact with each other to form a liquid film of the finishing agent on this member under treatment. The member under treatment is preferred to be one that has not been subjected to treatment for drying the surface treated with the chemical conversion treatment, i.e. one in a stage where the chemical conversion treatment has been completed and water washing has also been completed if necessary. This improves the adhesion between the chemical conversion coating formed by the chemical conversion treatment and the finishing coating formed by the finishing agent.

The temperature of the finishing agent in the contact step may freely be set. The method for contact may be performed, such as, but not limited to, by immersing a member having been formed thereon with the chemical conversion coating into the finishing agent according to the present invention, or spraying the finishing agent to the member. The thickness of the liquid film of the finishing agent is appropriately set depending on the thickness needed for the finishing coating.

(2) Drying Step

The liquid film obtained by the contact step is dried to be the finishing coating. The method for drying is freely chosen. The member comprising the liquid film may be placed in a stationary manner in an oven heated to a predetermined temperature, or blown with a heated gas, or a centrifugal drier may also be employed. Alternatively, air drying may be performed such that the member comprising the liquid film is placed in a stationary manner under normal environment.

EXAMPLES

Example 1

Some of possible aspects of the present invention will be described in details below as examples, but the present invention is not limited to these examples.

1. Preparation of Finishing Agents for Evaluation

Plural kinds of finishing agents were prepared by dissolving each component shown in Tables 1 to 6 into water. Each obtained finishing agent had a pH of 5.0. Note that finishing agents No. 37 to No. 44 shown in Table 6 were each caused to contain two kinds of organic acids as the organic acid compound. Note also that each numerical value presented in the column for the content in tables is a content of each component in the finishing agent, and the content in the water-soluble metal-containing substance is a molar concentration in metal contained in the substance equivalent.

TABLE 1

| | | Finishing agent No. | | | | | |
|---|---|---|---|---|---|---|---|
| | | 1 | 2 | 3 | 4 | 5 | 6 |
| Water-soluble trivalent chromium-containing substance | Supply source | Chromic phosphate aqueous solution (phosphorus concentration/chromium concentration = 2) | | | | | |
| | Content (mmol/L) | 96 | 96 | 96 | 96 | 96 | 96 |
| Water-soluble phosphoric acid-based compound | Supply source | Chromic phosphate aqueous solution (phosphorus concentration/chromium concentration = 2) | | | | | |
| | Content (mmol/L) | 192 | 192 | 192 | 192 | 192 | 192 |
| Cr/P | | 0.5 | 0.5 | 0.5 | 0.5 | 0.5 | 0.5 |
| Water-soluble organic acid compound | Supply source | Citric acid | Oxalic acid | Malic acid | Citric acid | Oxalic acid | Malic acid |
| | Content (mmol/L) | 102 | 102 | 102 | 102 | 102 | 102 |
| Water-soluble aluminum-containing substance | Supply source | — | — | — | Sodium aluminate (liquid) | | |
| | Content (mmol/L) | 0 | 0 | 0 | 96 | 96 | 96 |
| Water-soluble zirconium-containing substance | Supply source | — | — | — | — | — | — |
| | Content (mmol/L) | 0 | 0 | 0 | 0 | 0 | 0 |
| TM/P | | 0.5 | 0.5 | 0.5 | 1.0 | 1.0 | 1.0 |
| Matrix-forming component | Supply source | Polyvinyl alcohol | | | | | |
| | Content (g/L) | 0.4 | 0.4 | 0.4 | 0.4 | 0.4 | 0.4 |
| Treatment appearance evaluation | | 3 | 3 | 2 | 5 | 5 | 5 |
| Elution rate | | 45.4% | 10.5% | 13.6% | 14.6% | 3.4% | 5.3% |

TABLE 2

| | | \multicolumn{6}{c}{Finishing agent No.} | | | | | |
|---|---|---|---|---|---|---|---|
| | | 7 | 8 | 9 | 10 | 11 | 12 |
| Water-soluble trivalent chromium-containing substance | Supply source | \multicolumn{6}{c}{Chromic phosphate aqueous solution (phosphorus concentration/chromium concentration = 2)} | | | | | |
| | Content (mmol/L) | 96 | 96 | 96 | 96 | 96 | 96 |
| Water-soluble phosphoric acid-based compound | Supply source | \multicolumn{6}{c}{Chromic phosphate aqueous solution (phosphorus concentration/chromium concentration = 2)} | | | | | |
| | Content (mmol/L) | 192 | 192 | 192 | 192 | 192 | 192 |
| Cr/P | | 0.5 | 0.5 | 0.5 | 0.5 | 0.5 | 0.5 |
| Water-soluble organic acid compound | Supply source | Citric acid | Citric acid | Citric acid | Citric acid | Citric acid | Citric acid |
| | Content (mmol/L) | 102 | 102 | 102 | 102 | 102 | 102 |
| Water-soluble aluminum-containing substance | Supply source | — | Sodium aluminate (liquid) | | — | — | — |
| | Content (mmol/L) | 0 | 93 | 140 | 0 | 0 | 0 |
| Water-soluble zirconium-containing substance | Supply source | — | — | — | \multicolumn{3}{c}{Ammonium zirconium carbonate} | | |
| | Content (mmol/L) | 0 | 0 | 0 | 47 | 93 | 140 |
| TM/P | | 0.5 | 1.0 | 1.2 | 0.7 | 1.0 | 1.2 |
| Water-soluble zinc-containing substance | Supply source | Zinc oxide | — | — | — | — | — |
| | Content (mmol/L) | 92 | 0 | 0 | 0 | 0 | 0 |
| Matrix-forming component | Supply source | \multicolumn{6}{c}{Polyvinyl alcohol} | | | | | |
| | Content (g/L) | 0.4 | 0.4 | 0.4 | 0.4 | 0.4 | 0.4 |
| Treatment appearance evaluation | | 4 | 5 | 5 | 4 | 5 | 5 |
| Elution rate | | 33% | 11.8% | 9.3% | 12.1% | 9.2% | 5.5% |

TABLE 3

| | | \multicolumn{3}{c}{Finishing agent No.} | | | |
|---|---|---|---|---|
| | | 13 | 14 | 15 |
| Water-soluble trivalent chromium-containing substance | Supply source | \multicolumn{3}{c}{Chromium chloride} | | | |
| | Content (mmol/L) | 96 | 96 | 96 |
| Water-soluble phosphoric acid-based compound | Supply source | \multicolumn{3}{c}{Orthophosphoric acid} | | | |
| | Content (mmol/L) | 96 | 192 | 288 |
| Cr/P | | 1.0 | 0.5 | 0.3 |
| Water-soluble organic acid compound | Supply source | Citric acid | Citric acid | Citric acid |
| | Content (mmol/L) | 131 | 131 | 131 |
| Water-soluble aluminum-containing substance | Supply source | — | — | — |
| | Content (mmol/L) | 0 | 0 | 0 |
| Water-soluble zirconium-containing substance | Supply source | — | — | — |
| | Content (mmol/L) | 0 | 0 | 0 |
| TM/P | | 1.0 | 0.5 | 0.3 |
| Matrix-forming component | Supply source | \multicolumn{3}{c}{Polyvinyl alcohol} | | | |
| | Content (g/L) | 0.4 | 0.4 | 0.4 |
| Treatment appearance evaluation | | 2 | 3 | 4 |
| Elution rate | | 3% | 42.5% | 64.8% |

TABLE 4

| | | \multicolumn{6}{c}{Finishing agent No.} | | | | | |
|---|---|---|---|---|---|---|---|
| | | 23 | 24 | 25 | 26 | 27 | 28 |
| Water-soluble | Supply source | \multicolumn{6}{c}{Chromic phosphate aqueous solution (phosphorus concentration/chromium concentration = 3)} | | | | | |

TABLE 4-continued

| | | Finishing agent No. | | | | | |
|---|---|---|---|---|---|---|---|
| | | 23 | 24 | 25 | 26 | 27 | 28 |
| trivalent chromium-containing substance | Content (mmol/L) | 96 | 96 | 96 | 96 | 96 | 96 |
| Water-soluble phosphoric acid-based compound | Supply source | Chromic phosphate aqueous solution (phosphorus concentration/chromium concentration = 3) | | | | | |
| | Content (mmol/L) | 288 | 288 | 288 | 288 | 288 | 288 |
| | Cr/P | 0.33 | 0.33 | 0.33 | 0.33 | 0.33 | 0.33 |
| Water-soluble organic acid compound | Supply source | Citric acid | Citric acid | Citric acid | Citric acid | Citric acid | Citric acid |
| | Content (mmol/L) | 102 | 102 | 102 | 102 | 102 | 102 |
| Water-soluble aluminum-containing substance | Supply source | — | — | Sodium aluminate (liquid) | | | — |
| | Content (mmol/L) | 0 | 0 | 46.5 | 91.5 | 138 | 0 |
| Water-soluble zirconium-containing substance | Supply source | — | — | — | — | — | Ammonium zirconium carbonate |
| | Content (mmol/L) | 0 | 0 | 0 | 0 | 0 | 46.5 |
| Water-soluble zinc-containing substance | Supply source | — | Zinc oxide | — | — | — | — |
| | Content (mmol/L) | 0 | 91.5 | 0 | 0 | 0 | 0 |
| | TM/P | 0.3 | 0.7 | 0.5 | 0.7 | 0.8 | 0.5 |
| Matrix-forming component | Supply source | Polyvinyl alcohol | | | | | |
| | Content (g/L) | 0.4 | 0.4 | 0.4 | 0.4 | 0.4 | 0.4 |
| Treatment appearance evaluation | | 4 | 5 | 5 | 5 | 5 | 5 |
| Elution rate | | 65.2% | 46.3% | 18.2% | 12.4% | 9.3% | 12.8% |

TABLE 5

| | | Finishing agent No. | | | | | | | |
|---|---|---|---|---|---|---|---|---|---|
| | | 29 | 30 | 31 | 32 | 33 | 34 | 35 | 36 |
| Water-soluble trivalent chromium-containing substance | Supply source | Chromic phosphate | | | | | | | |
| | Content (mmol/L) | 96 | 96 | 96 | 96 | 96 | 96 | 96 | 96 |
| Water-soluble phosphoric acid-based compound | Supply source | Chromic phosphate, Orthophosphoric acid | | | | | | | |
| | Content (mmol/L) | 288 | 384 | 480 | 576 | 288 | 384 | 480 | 576 |
| | Cr/P | 0.33 | 0.25 | 0.20 | 0.17 | 0.33 | 0.25 | 0.20 | 0.17 |
| Water-soluble organic acid compound | Supply source | Oxalic acid | Oxalic acid | Oxalic acid | Oxalic acid | Malic acid | Malic acid | Malic acid | Malic acid |
| | Content (mmol/L) | 102 | 102 | 102 | 102 | 102 | 102 | 102 | 102 |
| Water-soluble aluminum-containing substance | Supply source | — | — | — | — | — | — | — | — |
| | Content (mmol/L) | 0 | 0 | 0 | 0 | 0 | 0 | 0 | 0 |
| Water-soluble zirconium-containing substance | Supply source | — | — | — | — | — | — | — | — |
| | Content (mmol/L) | 0 | 0 | 0 | 0 | 0 | 0 | 0 | 0 |
| | TM/P | 0.3 | 0.3 | 0.2 | 0.2 | 0.3 | 0.3 | 0.2 | 0.2 |
| Matrix-forming | Supply source | Polyvinyl alcohol | | | | | | | |

TABLE 5-continued

|  |  | Finishing agent No. | | | | | | | |
| --- | --- | --- | --- | --- | --- | --- | --- | --- | --- |
|  |  | 29 | 30 | 31 | 32 | 33 | 34 | 35 | 36 |
| component | Content (g/L) | 0.4 | 0.4 | 0.4 | 0.4 | 0.4 | 0.4 | 0.4 | 0.4 |
| Treatment appearance evaluation |  | 3 | 3 | 3 | 3 | 2 | 2 | 2 | 2 |
| Elution rate |  | 12.5% | 10.4% | 11.8% | 12.1% | 14% | 13.5% | 12.3% | 12.6% |

TABLE 6

|  |  | Finishing agent No. | | | | | | | |
| --- | --- | --- | --- | --- | --- | --- | --- | --- | --- |
|  |  | 37 | 38 | 39 | 40 | 41 | 42 | 43 | 44 |
| Water-soluble trivalent chromium-containing substance | Supply source | Chromic phosphate aqueous solution (phosphorus concentration/chromium concentration = 3) | | | | | | | |
|  | Content (mmol/L) | 96 | 96 | 96 | 96 | 96 | 96 | 96 | 96 |
| Water-soluble phosphoric acid-based compound | Supply source | Chromic phosphate aqueous solution (phosphorus concentration/chromium concentration = 3) | | | | | | | |
|  | Content (mmol/L) | 288 | 288 | 288 | 288 | 288 | 288 | 288 | 288 |
| Cr/P |  | 0.33 | 0.33 | 0.33 | 0.33 | 0.33 | 0.33 | 0.33 | 0.33 |
| Water-soluble organic acid compound 1 | Supply source | Citric acid | Citric acid | Citric acid | Citric acid | Citric acid | Citric acid | Citric acid | Citric acid |
|  | Content (mmol/L) | 76.5 | 69 | 46.5 | 22.5 | 76.5 | 76.5 | 46.5 | 196.5 |
| Water-soluble organic acid compound 2 | Supply source | Oxalic acid | Oxalic acid | Oxalic acid | Oxalic acid | Oxalic acid | Oxalic acid | Oxalic acid | Oxalic acid |
|  | Content (mmol/L) | 15 | 22.5 | 45 | 69 | 15 | 15 | 46.5 | 196.5 |
| Organic acid compound ratio (1:2) |  | 5:1 | 4.5:1.5 | 3:3 | 1.5:3.5 | 5:1 | 5:1 | 3:3 | 3:3 |
| Water-soluble aluminum-containing substance | Supply source | — | — | — | — | Sodium aluminate (liquid) | — | Sodium aluminate (liquid) | — |
|  | Content (mmol/L) | 0 | 0 | 0 | 0 | 46.5 | 0 | 46.5 | 0 |
| Water-soluble zirconium-containing substance | Supply source | — | — | — | — | — | Ammonium zirconium carbonate | — | Ammonium zirconium carbonate |
|  | Content (mmol/L) | 0 | 0 | 0 | 0 | 0 | 46.5 | 0 | 46.5 |
| TM/P |  | 0.3 | 0.3 | 0.3 | 0.3 | 0.5 | 0.5 | 0.5 | 0.5 |
| Matrix-forming component | Supply source | Polyvinyl alcohol | | | | | | | |
|  | Content (g/L) | 0.4 | 0.4 | 0.4 | 0.4 | 0.4 | 0.4 | 0.4 | 0.4 |
| Treatment appearance evaluation |  | 4 | 4 | 4 | 3 | 5 | 5 | 5 | 5 |
| Elution rate |  | 27.1% | 22.2% | 19.3% | 14% | 15.1% | 9.9% | 8.2% | 7.9% |

2. Preparation of Test Members

An M10 bolt (surface area: 50 cm$^2$) plated with electrogalvanizing for each test member was immersed into nitric acid (67.5% nitric acid 3 ml/L, liquid temperature: room temperature, immersion time: 10 seconds) to activate the surface thereof. The test member was then washed by water at room temperature during 10 seconds and immersed during 40 seconds in chemical conversion treatment liquid (prepared using YFB-NA7, YFB-NB7, and YFB-NC7 available from YUKEN INDUSTRY CO., LTD. on the basis of the basic conditions for those products) maintained at 40° C. with pH of 2.0.

After being picked up from the chemical conversion treatment liquid, the member was washed by water (room temperature, 10 seconds) and then immersed during 5 seconds in the finishing agent at 40° C. prepared through the above manner, followed by drying the member at 80° C. during 5 minutes using a centrifugal drier, and each test member comprising the finishing coating formed on the chemical conversion coating was thereby obtained.

3. Evaluation Methods (1) Elution Resistance

For each test member obtained in the above manner, the chromium content included in the finishing coating was measured by the following method.

Each test member was immersed into 70 ml of 0.5 mol/L HCl aqueous solution to dissolve the finishing coating and the chemical conversion coating. After the dissolution of the coatings was completed, the test member was picked up and washed by small amount of ion-exchanged water. The obtained dissolution liquid and washing liquid were mixed and the mixed liquid was diluted in a measuring cylinder to 100 ml total, followed by the measurement for the Cr concentration using ICP. The Cr concentration obtained in such a manner was used as the basis to obtain the Cr amount (unit: mg) contained in the finishing coating and the chemical conversion coating.

In addition, another test member formed thereon with only the chemical conversion coating was prepared through the same condition as the above, and that test member was also subjected to the dissolution of the chemical conversion coating and the measurement for the Cr concentration in the same manner as the above. The Cr concentration obtained in such a manner was used as the basis to obtain the Cr amount (unit: mg) contained in the chemical conversion coating.

Each test member was immersed during one hour in 70 ml of salt water for test used in salt spray test defined by JIS H 8502. The chromium concentration contained in the salt water after the one-hour immersion was measured by the following manner. The test member was picked up from the salt water for test after the one-hour immersion and washed by small amount of ion-exchanged water. The obtained salt water for test and washing water were mixed and the mixed liquid was diluted in a measuring cylinder to 100 ml total, followed by the measurement for the Cr concentration using ICP. The Cr concentration obtained in such a manner was used as the basis to obtain the Cr amount (unit: mg) dissolved into the salt water for test.

The elution rate $R_e$ was calculated from the Cr amount obtained in the above manner using the formula below.

$R_e$=(the Cr amount dissolved into the salt water for test)/((the Cr amount contained in the finishing coating and the chemical conversion coating)−(the Cr amount contained in the chemical conversion coating))×100

(2) Appearance

Respective test members obtained in the above manner were visually observed to be evaluated for their appearances in accordance with the criteria below:

1 (unusable as product): whole surface is not glossy or light gray colored;

2 (usable as product): partially having gloss and gray colored;

3 (good): partially having gloss and dark gray colored or black colored;

4 (excellent): substantially whole surface is glossy and strongly black colored or jet-black colored; and 5 (superior): whole surface is glossy and jet-black colored.

4. Evaluation Results

Evaluation results are shown in Tables 1 to 5.

Finishing agents No. 1 to No. 6, No. 8 to No. 14, and No. 25 to No. 44 represent examples according to the present invention, finishing agents No. 15 and No. 23 represent comparative examples, and finishing agents No. 7 and No. 24 represent reference examples. The elution rates related to finishing agents No. 1 and No. 14 employing only means 1 were comparable with or less than that related to finishing agent No. 24 as a reference example containing the water-soluble zinc-containing substance. Note that the finishing agent of No. 24 is highly likely unable to retain the treatment appearance initially obtained (the result shown in Table 4) when treatment is repeated for increased number of the treated members because it involves the problem that precipitation occurs as previously described. That is, finishing agent No. 24 has lower reliability and is difficult to be used industrially. This respect will further be discussed in Example 2.

The elution rates related to other examples according to the present invention employing at least means 2 or 3 were considerably lower than that related to finishing agent No. 24. In particular, the elution rates related to finishing agents No. 5 and No. 6 employing all of means 1 to 3 were about one-tenth that related to finishing agent No. 24, and excellent treatment appearances were obtained after the finishing treatment. As apparent from the results of tests No. 37 to No. 44, even for cases of containing conventionally used citric acid, either of means 2 or 3 was employed thereby to allow for providing finishing coatings having high elution resistance and excellent appearance, and in particular, means 2 and 3 were employed in combination thereby to allow for providing finishing coatings having significantly high elution resistance and significantly excellent appearance.

Example 2

Concentrated liquid 1 capable of preparing finishing agent No. 24 in Example 1 by being diluted with 150 ml/L was prepared.

Concentrated liquid 2 capable of preparing finishing agent No. 27 in Example 1 by being diluted with 150 ml/L was prepared.

Concentrated liquid 3 capable of preparing finishing agent No. 28 in Example 1 by being diluted with 150 ml/L was prepared.

Concentrated liquids 1 to 3 were placed in a constant temperature reservoir at a controlled temperature of 40° C. during 14 days to provide concentrated liquids 1a, 2a, and 3a.

Concentrated liquid 1 was also placed in a constant temperature reservoir at a controlled temperature of 40° C. during 21 days to provide concentrated liquid 1b.

Both concentrated liquids 1a and 1b were observed to have sedimentation of components containing zinc. For that reason, the zinc concentration in concentrated liquid 1 was 0.60 mol/L whereas the zinc concentrations in concentrated liquids 1a and 1b were 0.40 mol/L and 0.27 mol/L, respectively.

A transfer pump was placed to have its suction opening reaching the bottom of a reservoir stored therein with concentrated liquid 1a, and the transfer pump was driven under a condition capable of dilution with 150 ml/L for concentrated liquid 1 thereby to transfer a part of concentrated liquid 1a into a reservoir stored therein with a predetermined quantity of water. Finishing agent No. 45 was obtained by stirring the water mixed thereto with concentrated liquid 1a. Zinc concentration contained in finishing agent No. 45 was measured to be 42.0 mmol/L which was lower than that expected on the basis of the zinc concentration in concentrated liquid 1a (60 mmol/L) because the proper operation of the transfer pump was blocked by the sedimentation components including zinc.

Finishing agent No. 45 was used to form the finishing coating on an M10 bolt like Example 1, and evaluations for properties of the coating were performed. Consequently, the elution ratio was similar to that in the case of not containing zinc, i.e. the case of finishing agent No. 23, and the appearance was recognized to be deteriorated compared to the case of finishing agent No. 23, because the content of effective components was decreased as the above.

Finishing agent No. 46 was obtained by performing the same operation for concentrated liquid 1b as that for obtaining finished agent No. 45 from concentrated liquid 1a. The zinc concentration in finishing agent No. 46 was further decreased than that of finishing agent No. 45 to 18.2 mmol/L. Finishing agent No. 46 was used to form the finishing coating on an M10 bolt like Example 1, and evaluations for properties of the coating were performed. Consequently, the elution ratio was higher than that in the case of finishing agent No. 45, and the deterioration in appearance was more considerable than that in the case of finishing agent No. 45.

trated liquids 2 and 3 as that for obtaining finishing agent No. 45 from concentrated liquid 1a. Those finishing agents were used to form the finishing coatings on M10 bolts like Example 1, and evaluations for properties of the coatings were performed. Consequently, neither of the finishing agents was recognized to have any substantial change in the evaluation results. The above results are collectively shown in Table 7.

TABLE 7

| | | Finishing agent No. | | | | |
|---|---|---|---|---|---|---|
| | | 45 | 46 | 47 | 48 | 49 |
| Water-soluble trivalent chromium-containing substance | Supply source | Chromic phosphate aqueous solution (phosphorus concentration/chromium concentration = 3) | | | | |
| | Content (mmol/L) | 67.2 | 43.2 | 96 | 96 | 96 |
| Water-soluble phosphoric acid-based compound | Supply source | Chromic phosphate aqueous solution (phosphorus concentration/chromium concentration = 3) | | | | |
| | Content (mmol/L) | 202 | 129 | 288 | 288 | 288 |
| Cr/P | | 0.33 | 0.33 | 0.33 | 0.33 | 0.33 |
| Water-soluble organic acid compound | Supply source | Citric acid | Citric acid | Citric acid | Citric acid | Citric acid |
| | Content (mmol/L) | 71.4 | 45.9 | 102 | 102 | 102 |
| Water-soluble aluminum-containing substance | Supply source | — | — | — | Sodium aluminate (liquid) | — |
| | Content (mmol/L) | 0 | 0 | 0 | 138 | 0 |
| Water-soluble zirconium-containing substance | Supply source | — | — | — | — | Ammonium zirconium carbonate |
| | Content (mmol/L) | 0 | 0 | 0 | 0 | 46.5 |
| Water-soluble zinc-containing substance | Supply source | | Zinc oxide | | — | — |
| | Content (mmol/L) | 42.0 | 18.2 | 59.5 | 0 | 0 |
| TM/P | | 0.5 | 0.5 | 0.5 | 0.8 | 0.5 |
| Matrix-forming component | Supply source | Polyvinyl alcohol | | | | |
| | Content (g/L) | 0.4 | 0.4 | 0.4 | 0.4 | 0.4 |
| Treatment appearance evaluation | | 3 | 2 | 4 | 5 | 5 |
| Elution rate | | 58.4% | 61.4% | 52.7% | 9.5% | 11.1% |

Clear supernatant liquid was sampled from concentrated liquid 1a, and finishing agent No. 47 was obtained by diluting the clear supernatant liquid with 150 ml/L. The zinc concentration in finishing agent No. 47 was approximately as expected.

Finishing agent No. 47 was used to form the finishing coating on an M10 bolt like Example 1, and evaluations for properties of the coating were performed. Consequently, the elution ratio was slightly higher than that in the case of finishing agent No. 24. The appearance was more deteriorated than that in the case of finishing agent No. 24, which was a similar result to finishing agent No. 23 not containing zinc.

Concentrated liquids 2a and 3a were observed to have no sedimentation component, and no change was measured in concentration of each effective component compared to concentrated liquids 2 and 3.

Finishing agents No. 48 and No. 49 were respectively obtained by performing the same operations for concen-

The invention claimed is:
1. A finishing agent for forming a finishing coating on a member under treatment, the member under treatment being a member a surface of which has been treated with chemical conversion treatment, the finishing agent containing:
   a water-soluble phosphoric acid-based compound comprising one or more water-soluble substances selected from the group consisting of orthophosphoric acid and condensed phosphoric acid, ions thereof, and salts and coordination compounds including the ions thereof;
   a water-soluble organic acid compound comprising one or more water-soluble substances selected from organic acids, ions thereof, and salts and coordination compounds including the ions thereof;
   a water-soluble trivalent chromium-containing substance; and
   an organic-based material as a matrix-forming component;
   wherein the finishing agent contains no nitric acid ion,
   wherein the finishing agent contains at least one kind selected from the group consisting of a water-soluble aluminum-containing substance and a water-soluble zirconium-containing substance, and the ratio of the total of the chromium equivalent molar concentration of the water-soluble trivalent chromium-containing substance, an aluminum equivalent molar concentration of the water-soluble aluminum-containing substance, and a zirconium equivalent molar concentration of the water-soluble zirconium-containing substance relative to the phosphorus equivalent molar concentration of the water-soluble phosphoric acid-based compound is 0.5 or more and less than or equal to 1.5, wherein the ratio of a trivalent chromium equivalent molar concentration of the water-soluble trivalent chromium-containing substance relative to a phosphoric acid equivalent molar concentration of the water-soluble phosphoric acid-based compound is 0.2 or more and equal to or less than 1.0, and wherein the water-soluble organic acid compound comprises at least one of citric acid and ions thereof.

2. The finishing agent as set forth in claim 1, not containing at least one of a sulfuric acid ion and a chloride ion.

3. The finishing agent as set forth in claim 1, wherein the organic-based material as the matrix-forming component includes polyvinyl alcohol.

4. A method for producing a member having a finishing coating, the method comprising: a contact step that causes a member under treatment, as a member a surface of which has been treated with chemical conversion treatment, and the finishing agent as set forth in claim 1 contact with each other to form a liquid film of the finishing agent on a chemical conversion coating of the member, and a drying step that dries the liquid film obtained by the contact step to provide the finishing coating.

5. The method as set forth in claim 4, wherein the member under treatment is one that has not been subjected to treatment for drying the surface treated with the chemical conversion treatment.

6. A method for producing a member having a finishing coating, the method comprising: a contact step that causes a member under treatment, as a member a surface of which has been treated with chemical conversion treatment, and the finishing agent as set forth in claim 4 to contact with each other to form a liquid film of the finishing agent on a chemical conversion coating of the member; and a drying step that dries the liquid film obtained by the contact step to provide the finishing coating.

7. A method for producing a member having a finishing coating, the method comprising: a contact step that causes a member under treatment, as a member a surface of which has been treated with chemical conversion treatment, and the finishing agent as set forth in claim 3 to contact with each other to form a liquid film of the finishing agent on a chemical conversion coating of the member; and a drying step that dries the liquid film obtained by the contact step to provide the finishing coating.

* * * * *